June 10, 1924.                                    1,497,159
H. PORTER
HEAT AND COLD INSULATING RECEPTACLE
Filed March 11, 1922
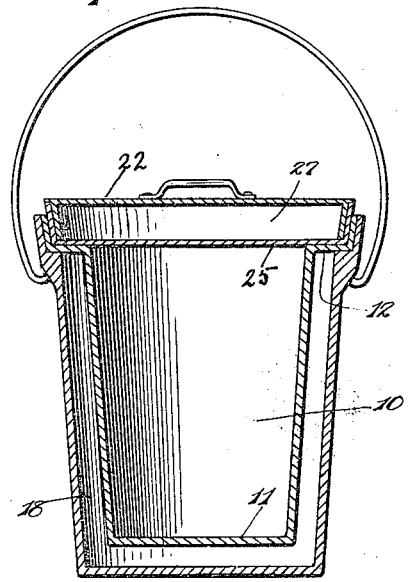
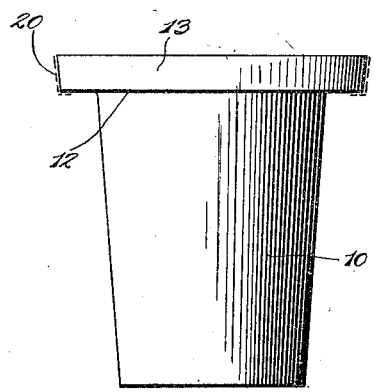
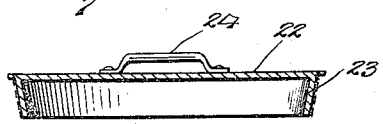
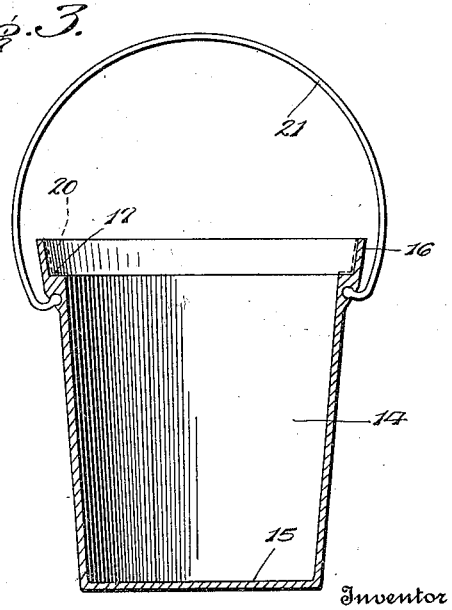
Inventor
H. Porter.
By
Lacey & Lacey, Attorneys Patented June 10, 1924.

1,497,159

UNITED STATES PATENT OFFICE.

HERBERT PORTER, OF WENATCHEE, WASHINGTON.

HEAT AND COLD INSULATING RECEPTACLE.

Application filed March 11, 1922. Serial No. 543,013.

*To all whom it may concern:*

Be it known that I, HERBERT PORTER, a citizen of the United States, residing at Wenatchee, in the county of Chelan and State of Washington, have invented certain new and useful Improvements in Heat and Cold Insulating Receptacles, of which the following is a specification.

My invention relates to a receptacle intended to hold solid or liquid foods, which is so constructed that it will keep its contents either cold or warm for a considerable length of time.

I have found from practical tests, that a receptacle of this character and construction in the preferred form of a pail, as presented in the drawing, is able to keep a liquid hot for three or four hours, while it will keep ice cream from melting for two to three hours, both while the external or atmospheric temperature is normal or about 65° F.

One object of the invention is now to manufacture these receptacles, whether in the form of pails, boxes, or baskets, of a material best suited for this purpose, and at the same time made so cheaply, that they may find general favor with the public and that they may be within reach of every home even the humblest.

In the accompanying drawing the preferred embodiment of the invention is illustrated, and Figure 1 shows in vertical section a pail according to my invention;

Figure 2 is an elevation of the inner vessel;

Figure 3 is a vertical section of the outer vessel; and

Figure 4 is a vertical section of the lid for the bucket with the two component parts separated.

The inner vessel 10 is made in the shape of a conic frustum of compressed paper or wood pulp, or any other similar material which has the properties of being a slow heat conductor. This inner vessel has a flat bottom 11 and an external angular flange 12 around its upper edge, which flange terminates with a cylindrical portion 13.

The outer vessel 14, which is built of the same kind of material as the inner vessel, has also the general outline of a conic frustum with a flat bottom 15 and a cylindrical collar 16 at its upper or open end. Between the collar 16 and the main body of the outer vessel 14 is formed a ledge or shoulder 17 on the inside of the pail. The outer vessel 14 is of considerably larger diameter than the inner vessel so that a space 18 is formed between the walls as well as between the bottoms of the two vessels when they are assembled as in Figure 1.

The flange 12 with its cylindrical portion 13 is made to fit tightly inside the collar 16 so that the flange 12 rests on the ledge 17 in the outer vessel 14. In this manner the inner vessel 10 is suspended from this flange 17 on the outer vessel 14, so that the main portion of the inner vessel hangs perpendicularly and is spaced from the walls and bottom of the outer vessel 14.

A suitable adhesive, such as cement, or glue 20, indicated by dotted lines in Figures 2 and 3, provides a hermetically closed joint between the cylindrical portions of the two vessels, in order to prevent any air from passing into or out from the chamber 18 formed between the two vessels. A suitable handle 21 is provided engaging under the cylindrical collar 16 of the outer vessel to facilitate transportation.

The lid for the receptacle is constructed in the same manner and of the same material as the vessel itself, that is to say the upper part has a top 22 and an annular side wall 23, which makes the upper part of the lid in the form of an inverted shallow cup, and a handle 24 is provided on the top 22 thereof, so that the lid may be conveniently removed. The lower portion of the lid is also in the shape of a shallow cup with a bottom 25 and an annular side wall 26 and the annular side walls of the two cups may be slightly tapered in order to fit more tightly together and also in the top of the vessel. The side wall 26 of the lower cup is of larger diameter than the side wall 23 of the upper one so that the upper cup fits inside of the lower cup. Between the side walls of the two cups is also applied an adhesive 28 to make an airtight joint between the cups and prevent the passage of air to or from the chamber 27 formed between the top and bottom of the lid.

It is evident that the receptacle may be made in many different shapes, not only conical, as shown in the accompanying drawing, but also cylindrical or in the form of a box or basket, which will be within the scope of the invention, as long as airtight chambers are provided in the receptacle itself as well as in its lid.

Having thus described the invention what is claimed as new is:

1. A heat insulating receptacle of compressed paper, comprising an outer vessel having an enlarged mouth portion providing an internal annular rabbet adjacent its upper edge, an inner vessel provided with a corresponding, enlarged mouth portion having a shoulder and upstanding flange engaging said rabbet, an air space being provided between the bottoms as well as between the walls of said vessels, and the joint between said upstanding flange and said rabbet being hermetically sealed.

2. A heat insulating receptacle of compressed paper, comprising an outer vessel having an enlarged mouth portion providing an internal annular rabbet adjacent its upper edge, an inner vessel provided with a corresponding, enlarged mouth portion having a shoulder and upstanding flange engaging said rabbet, an air space being provided between the bottoms as well as between the walls of said vessels, and the joint between said upstanding flange and said rabbet being hermetically sealed; a lid for said receptacle having spaced top and bottom walls forming a hermetically sealed chamber, said enlarged mouth portion of the inner vessel providing a seat for said lid and forming a tight joint therewith.

3. A heat insulating receptacle of compressed paper, comprising an outer vessel having an enlarged mouth portion providing an internal annular rabbet adjacent its upper edge, an inner vessel provided with a corresponding, enlarged mouth portion having a shoulder and upstanding flange engaging said rabbet, an air space being provided between the bottoms as well as between the walls of said vessels, and the joint between said upstanding flange and said rabbet being hermetically sealed; a heat insulating lid of compressed paper consisting of an outer flanged cup and an inverted cup correspondingly flanged to engage within the flange of said outer cup and forming a hermetically sealed space between them, said enlarged mouth piece of the inner vessel providing a seat for said lid and forming a tight joint therewith.

In testimony whereof I affix my signature.

HERBERT PORTER. [L. S.]